United States Patent [19]

Linser

[11] 3,960,166

[45] June 1, 1976

[54] VALVE ASSEMBLY KIT

[75] Inventor: Jörg Linser, Heuback-Lautern, Germany

[73] Assignee: Artur Fischer, Tumlingen, Germany

[22] Filed: July 18, 1974

[21] Appl. No.: 489,949

[30] Foreign Application Priority Data

July 20, 1973 Germany............................ 2336989

[52] U.S. Cl.............................. 137/271; 251/368; 35/13
[51] Int. Cl.².................. F16K 11/00; G09B 23/06
[58] Field of Search............ 35/13, 49, 51; 251/368, 251/367; 137/269, 271, 315

[56] References Cited
UNITED STATES PATENTS

| | | | |
|---|---|---|---|
| 2,269,035 | 1/1942 | Neal........................................ | 35/13 |
| 2,907,121 | 10/1959 | Yelinek et al. ......................... | 35/13 |
| 2,947,320 | 8/1960 | Oxley et al............................. | 137/271 |
| 3,521,850 | 7/1970 | German ................................. | 137/271 |
| 3,540,135 | 11/1970 | Alcosser et al. ..................... | 35/19 A |
| 3,719,199 | 3/1973 | Mentink............................... | 137/269 |
| 3,848,626 | 11/1974 | Smith................................... | 137/269 |

*Primary Examiner*—Martin P. Schwadron
*Assistant Examiner*—Robert J. Miller
*Attorney, Agent, or Firm*—Michael J. Striker

[57] ABSTRACT

A valve assembly kit permits the assembling of a plurality of different slide valves each having an elongated housing element formed with a main passage, fluid passages communicating with the main passage, and fluid ports which also communicate with the main passage, and an elongated valve spool element slidably receivable in the main passage. One or both of these elements comprises a plurality of diverse but interchangeable components which can be coaxially assembled in different sequences so as to obtain a selectable configuration of the respective element.

12 Claims, 5 Drawing Figures

VALVE ASSEMBLY KIT

BACKGROUND OF THE INVENTION

The present invention relates generally to valves, and more particularly to a valve assembly kit for assembling a plurality of slide valves.

The use of valves for controlling the flow of hydraulic or pneumatic fluid is very well developed in the industry, and such valves are used, inter alia, for controlling and operating various types of machines, systems and the like. The number of control functions which must be performed in fluid circuits by the associated valves is large and extremely diverse. Because of this, a correspondingly large and diverse number of different types of valves is required, the types ranging from the simple two-way valve to the servo and pressure regulating valves.

Each type of valve is constructed separately, that is each valve is a complete finished unit which is installed in the fluid system to be controlled. The complexity of the various functions to be performed in different fluid systems by the associated valves makes it impossible to have special valves for each type of application. Therefore, the designer and builder of fluid systems is often forced, for reasons of expedience and economy, to design his system so that it can utilize valves of the various types which are already commercially available, rather than having to design and build specialty valves. This, however, quite frequently requires that the overall complexity of the system is increased over what would inherently be necessary if valves specifically adapted for the required functions of the particular system would be available.

This is a decided disadvantage in the prior art.

A futher disadvantage relating to the available fluid flow controlling valves is concerned not with the industrial use of such valves, but with the applicability of the valves in teaching functions. Technical and other schools usually teach the principles of pneumatics and hydraulics, and for this purpose install various fluid systems on hand of which the principles are demonstrated to the students. With these systems, it is possible to demonstrate to the students how the system reacts to the operation of its associated valves, but it is not possible to demonstrate what takes place within the valve itself when the valve so operates. This is a decided disadvantage.

Furthermore, although theoretically it would be desirable to acquaint the students with as many different types of valves as possible, as well as with the manner in which each valve performs its respective functions, in practice this is not possible because most schools simply do not have the budget necessary to permit them to obtain samples of the many different types of valves.

SUMMARY OF THE INVENTION

For all of the above reasons, it is an object of the invention to overcome the disadvantages that have been outlined before.

More particularly, it is an object of the invention to provide a valve assembly kit which makes it possible to assemble a plurality of different valves at the option and will of a user.

A further object of the invention is to provide such an assembly kit which can be used to advantage for teaching purposes, and which requires a relatively small number of components to permit the assembly of various different valves which offer a large number of control and regulating possibilities for fluid circuits.

In keeping with these objects, and with others which will become apparent hereafter, one feature of the invention resides in a valve assembly kit for assembling a plurality of different slide valves which, briefly stated, comprises an elongated housing element formed with a main passage, fluid passages communicating with the main passage, and fluid ports which also communicate with the main passage. An elongated valve spool element is slidably receivable in the main passage, at least one of these elements comprising a plurality of diverse but interchangeable components which can be coaxially assembled in different sequences so as to obtain a selectable configuration of the one element. Connecting means is provided for coaxially connecting the components in respective desired sequences.

This construction of the novel assembly kit makes it possible to use a relatively small number of basic elements for assembling any conceivable types of slide valves or valve combinations. It is now possible to assemble valves which act as flow valves, throttle valves, pressure regulating valves, quantity regulating valves and pressure differential valves. It is also possible to assemble valves which constitute combinations of these basic valve types. Since only a few basic elements are required to assemble a desired valve, the expenses involved in producing any desired types of valves are very low, an advantage which is not only of importance in industrial applications but particularly in teaching where a particular valve type is required for only a relatively brief period of time, namely the time during which it is to be studied by the students, and can then be disassembled and its components reassembled to produce a different type of valve.

A very particular advantage of the invention is the fact that when the assembly kit is used for teaching applications, the invention will significantly increase the degree of understanding that can be obtained by the students. The student no longer considers the finished valve, as was heretofore the case, but considers the individual components which are assembled in order to produce a finished valve, and thus gains a much better understanding of the principles involved in valve construction. This is most important for an understanding of hydraulic and pneumatic control effects, since—for example—throttle effects take place in a valve which permit the regulation of pressure, of forces, of flow speed and the like in the system.

By having a plurality of readily manufacturable components in the assembly kit, the difficulties which heretofore prevented the manufacture of hydraulic and pneumatic parts for use in kits, such as kits used for teaching purposes, have been overcome. It is a very simple matter to assemble the components according to the present invention, simply by sliding them onto an assembling mandrel the outer diameter of which corresponds to the inner diameter of the valve chamber. When the components are assembled in the desired manner and sequence, they are connected and the mandrel is then removed.

The novel features which are considered as characteristic for the invention are set forth in particular in the appended claims. The invention itself, however, both as to its construction and its method of operation, together with additional objects and advantages thereof, will be best understood from the following description of specific embodiments when read in con-

DESCRIPTION OF THE PREFERRED EMBODIMENTS

Figure 1:
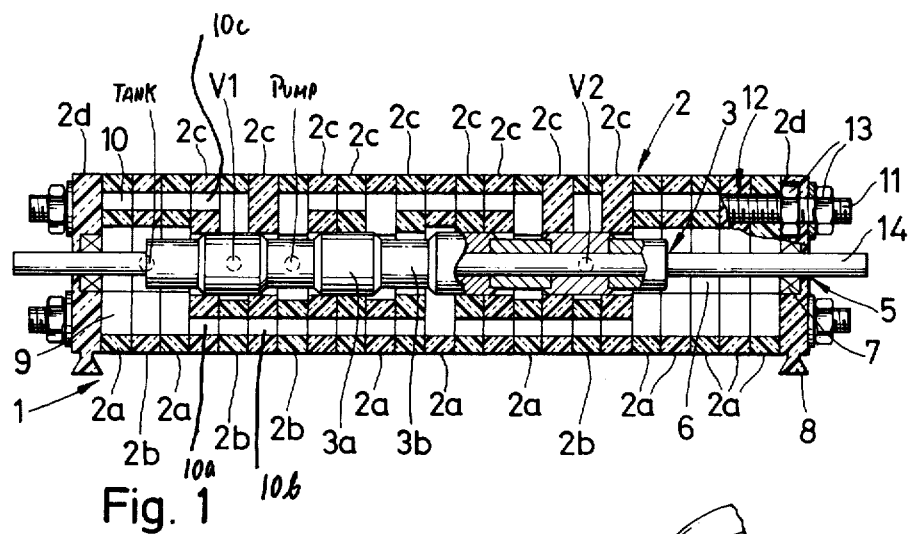
FIG. 1 is an axial section through an exemplary valve which is assembled from the components of an assembly kit according to the present invention.

In FIG. 1, I have illustrated by way of example a valve that can be assembled from the components of the assembly kit according to the present invention, which components are shown in FIGS. 2–5. The following discussion of FIG. 1 should therefore be considered in conjunction with FIGS. 2–5.

The exemplary valve 1 assembled from the assembly kit having the components of FIGS. 2–5 uses a total of 25 such components 2a, 2b, 2c and 2d. FIGS. 2–5 illustrate the components 2a–2d, respectively. These components are used to produce the housing of the valve 1, which is identified with reference numeral 2. The valve spool 3 is also assembled from individual components, which are not separately shown but are clearly visible in FIG. 1. These components are identified with reference numerals 3a and 3b, and in order to produce the particular illustrated valve spool 3, nine of these components 3a and 3b are required.

Four of the housings components 2b of the valve housing 2 are provided with ports of which one serves for connection to a pump, one for connection to the fluid reservoir, and two for connection to users V1 and V2, respectively.

The two end covers 2d are each provided with a central bore 5 in which the valve rod 14 of the valve spool 3 is slidably received. The components 2a, 2b and 2c together define a valve chamber or main passage 6, and to seal this valve chamber 6 the bores 5 are additionally provided with sealing elements 7 which effect this sealing function when the end covers 2d are in place. To make it possible to connect the assembled valve housing 2 with other elements, for instance with elements of a building kit or the like, undercut connecting elements 8 (such as undercut grooves or undercut heads) are provided on the end covers 2d which can cooperate with matingly configurated similar elements on elements of a building kit.

The particular type of valve or valve combination that is desired to be obtained, depends upon the sequence in which the components 2a–2c are arranged, and the orientation which they assume in circumferential direction of the valve housing, as well as the sequence in which the components 3a and 3b are mounted on the valve rod 14.

In the illustrated embodiment of FIG. 1, ten of the elements 2a with inner fluid supply 9 and a fluid passage 10 were utilized, four of the elements 2b with inner fluid supply 9 and outer fluid supply or port 15 were employed, as well as with the passages 10, and nine of the control elements 2c with the control edges and with the three fluid passages 10a, 10b and 10c were used. In the illustrated embodiment, all of the components 2a–2d are formed in their respective corner regions with openings 12 through which four tension rods 11 are extended which are threaded at least at their ends so that nuts 13 can be threaded onto these ends which extend past the end covers 2d and, when tightened, can push the end covers against the components 2a–2c and push the latter against one another so as to obtain a fluid-tight connection.

The valve spool 3 has the valve rod 14 which has a constant outer diameter over its entire length, the elements 3a provided with control edges, and the spacer elements 3b which are located between respective ones of the elements 3a and have a somewhat smaller outer diameter than the elements 3a.

In order to assemble the valve in FIG. 1, an assembly mandrel (not shown) is used, having an outer diameter which corresponds to the outer diameter of the elements 3a of the valve spool, and thus to the inner diameter of the valve chamber 6. The components 2a, 2b and 2c are pushed onto this mandrel in the selected sequence, whereupon the rods 11 are pushed through the narrow aligned openings 12 and nuts 13 are threaded onto them and tightened. Now, the assembly mandrel is withdrawn and the valve spool 3 is pushed into the valve chamber 6, whereupon the end covers 2d are pushed onto the opposite ends of the rod 14 so that the end portions of the rods 11 extend through the openings 12 of the end covers 2d, to permit additional nuts 13 to be threaded onto the rods 11 and tightened to hold the end covers in place. The components 2a–2d are all of quadratic cross section in the illustrated embodiment, as is evident from the several Figures. The component 2a has an inner fluid supply passage 9 and a fluid flow passage 10. The diameter of the bore 6 which in combination with the similar bores of the other compents forms the valve chamber 6, is slightly larger than the outer diameter of the component 3a of the valve spool 3.

Figure 2:
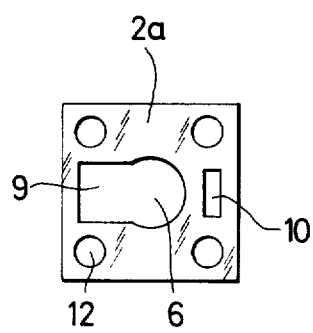
FIG. 2 is an end view of one of the components of the assembly kit, namely a spacing element having an inner fluid supply and a fluid passage.
Figure 3:
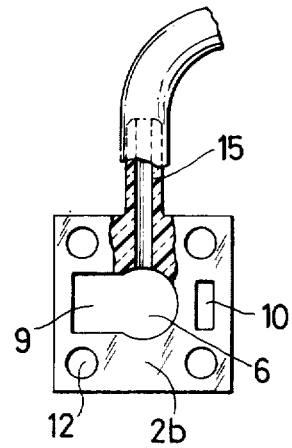
FIG. 3 is a view similar to FIG. 2 showing a further spacing element having inner and outer fluid supplies and a fluid passage.

The component 2b shown in FIG. 3 is the same as the component 2a of FIG. 2, but is in addition provided with an inlet nipple or port 15.

Figure 4:
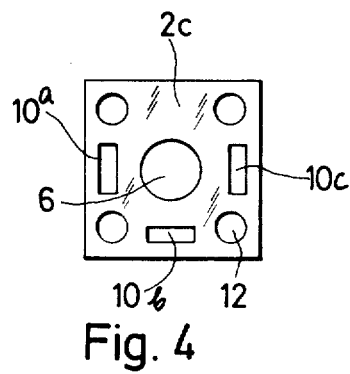
FIG. 4 is a view similar to FIG. 3 showing a control component having control edges and three fluid passages.

The control component 2c shown in FIG. 4 has a bore 6 the diameter of which corresponds to the outer diameter of a component 3a of the valve spool, and the control edges bounding the opposite axial ends of this bore 6 in the component 2c cooperate with the components 3a to control the flow of fluid in the housing 2. The passage 10 of the components 2a and 2b is here replaced with three similar passages 10a, 10b and 10c which again serve for the flow of the pressure fluid but which are angularly spaced from one another.

Figure 5:
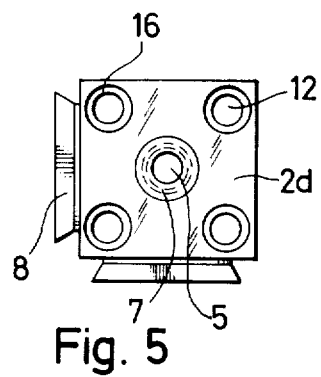
FIG. 5 is a view similar to FIG. 4 but showing an end cover having a central journalling bore for the valve spool, and a sealing ring.

The end covers 2d, one of which is shown in FIG. 5, are provided with the bores 5 for the rod 14, and the bores 5 each accommodate a sealing ring 7 which engages the rod 14 to seal the chamber 6. Those end faces of the components 2d which in the assembled condition face the other components 2a–2c located between the end covers 2d, are formed with recesses 16 having a depth corresponding at least to the thickness of the nuts 13 which are threaded onto the rods 11 in order to hold the components 2a–2c to one another before the end covers 2d are applied to the housing 2.

It is evident from FIG. 1 that the components 2c can be installed in different orientations, that is that for example the marginal region which is not provided with one of the openings or passages 10a–10c may face upwardly (in FIG. 1), to one side, to another side, and the like. This depends upon the type of fluid flow path which it is intended to provide in the interior of the housing 2 in cooperation with the respective openings 10a, 10b or 10c, or without such cooperation.

It is evident that the components 2a–2d need not be of quadratic configuration, but could be of rectangular configuration, circular configuration, or the like. It is also possible to provide other ways of connecting the components with one another than the rods 11 and nuts 13 which have been described and illustrated.

The connection of the respectively assembled valve housing 2 with the reservoir, the pump and the users V1 and V2 is obtained by pushing a hose (a portion of hose is shown in FIG. 3) in frictionally retained tight engagement onto one of the nipples 15 of a respective component 2b.

The components 3a and 3b may be frictionally retained on the rod 14, or may be retained by threading nuts onto the rod 14 which engage the terminal ones of the components 3a, 3b, or they may be retained in other suitable ways. What is important is that the valve spool 3 is also made of interchangeable components, as shown in FIG. 1, it also can be readily and economically changed to accommodate it to particular requirements.

A further advantage is obtained if, in accordance with a concept of the invention, at least the components 2a–2c, and preferably also the other components, are made of synthetic plastic material, especially and preferably of transparent synthetic plastic material, to permit visual observation of the operations that take place within the assembled valve. This further increases the teaching effect if it is used for teaching purposes. A synthetic plastic material that has been found particularly advantageous for this purpose is transparent styrene acrylic nitrile (SAN), because it not only permits such visual observation but also does not absorb liquids and therefore cannot swell and cause difficulties in the operation of the valve.

It will be understood that each of the elements described above, or two or more together, may also find a useful application in other types of constructions differing from the type described above.

While the invention has been illustrated and described as embodied in a valve assembly kit, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve assembly kit for assembling a plurality of different slide valves, comprising a plurality of diverse interchangeable housing components wherefrom an elongated housing element may be assembled, a plurality of spool components wherefrom a valve spool element may be assembled and connecting means; said housing components being of identical contour and each of them being formed with an axially extending main passage portion configurated and dimensioned identically with those of the other of these housing components, so that, when said housing components are coaxially assembled in different sequence and orientation to obtain a selectable configuration of said housing element, an axial main fluid passage is formed from said main passage portions for channeling the flow of fluid in a predetermined path; some of said housing components including fluid ports opening outwardly and also communicating with the main fluid passage portion of the housing components wherein they are formed; one group of said housing components containing one single axially extending lateral fluid passage portion and the other group of said housing components containing several axially extending lateral fluid passage portions, all these lateral fluid passage portions being equally shaped and distributed about, and spacedly from, the periphery of said housing components, so that different positioning and orientation of said housing components in the assembled elongated housing element provide therein axially extending lateral fluid passages selectably interconnecting said fluid ports and communicating with said main fluid passage; the spool components wherefrom the elongated valve spool element can be assembled being elongate in form and having in one series thereof a diameter smaller than that of said main fluid passage in the assembled housing element and having the other series thereof shaped and dimensioned to be in the assembled housing element engageable with the interior wall of said main fluid passage and slidable therein, so that said assembled spool element, in dependence on the respective shapes and location therein of said spool components, when the latter is shifted, either blocks or frees the fluid passage through said main fluid passage to or from the one and the other of said ports; and said connecting means being formed to be engageable with the housing components for coaxially connecting the same and securing them in respective desired sequencies.

2. A valve assembly kit as defined in claim 1, wherein said housing components each have a circumferential wall, an axially extending main passage and at least one axially extending channel, some of said components also having a port in said circumferential wall and communicating with said main passage; and wherein said housing element further comprises a pair of end covers.

3. A valve assembly kit as defined in claim 2, wherein said connecting means comprises rods extending longitudinally of said housing unit and connecting said components and end covers, said rods pressing said components and end covers fluid-tightly against one another.

4. A valve assembly kit as defined in claim 2, wherein said components are of synthetic plastic material.

5. A valve assembly kit as defined in claim 2, wherein said components are of transparent synthetic plastic material.

6. A valve assembly kit as defined in claim 2, wherein said components are of transparent styrene acrylic nitrile (SAN).

7. A valve assembly kit as defined in claim 2, wherein the flow of fluid within the assembled housing can be channeled in different paths in dependence upon the relative orientation of said housing components in direction circumferentially of said housing element.

8. A valve assembly kit as defined in claim 2, wherein said end covers have outer circumferential surfaces provided with undercut coupling portions.

9. A valve assembly kit as defined in claim 8, wherein said coupling portions comprise undercut projecting coupling heads.

10. A valve assembly kit for assembling a plurality of different slide valves, comprising an elongated housing element formed with a main passage, a pair of end covers, fluid passages communicating with said main passage, and fluid ports which also communicate with said main passage; an elongated valve spool element slidably receivable in said main passage, at least one of said elements comprising a plurality of diverse but interchangeable components which can be coaxially assembled in different sequences and relative orientations so as to obtain a selectable configuration of said one element, said components of said housing element each having a circumferential wall, an axially-extending main passage portion and at least one axially-extending channel portion, some of said components also having a port in said circumferential wall and communicating with said main passage, said components of said housing element further comprising first spacing components each having a fluid channel corresponding with said main passage portion and a fluid flow opening, second spacing components each having a fluid channel communicating with said main passage portion and also having one of said ports and a fluid flow opening, and flow control components each having three of said fluid flow openings, all of said fluid flow openings extending axially of the respective main passage; and connecting means for coaxially connecting said components in respective desired sequences.

11. A valve assembly kit as defined in claim 10, wherein said end covers each have an opening adapted to register with said main passage, and a seal adapted to sealingly engage the respectively adjacent compartment.

12. A valve assembly kit for assembling a plurality of different slide valves, comprising an elongated housing element formed with a main passage, fluid passages communicating with said main passage, and fluid ports which also communicate with said main passage; an elongated valve spool element slidably receivable in said main passage, at least one of said elements comprising a plurality of diverse but interchangeable components which can be coaxially assembled in different sequences and relative orientations so as to obtain a selectable configuration of said one element, said components of said valve spool element comprising annular flow control components which have flow control edges and annular spacing components; and connecting means for coaxially connecting said components in respective desired sequences, said connecting means including a rod on which said components of said valve spool element may be mounted in selectable axial sequence.

* * * * *